United States Patent [19]

Nayfeh et al.

[11] Patent Number: 5,584,014

[45] Date of Patent: Dec. 10, 1996

[54] APPARATUS AND METHOD TO PRESERVE DATA IN A SET ASSOCIATIVE MEMORY DEVICE

[75] Inventors: Basem A. Nayfeh, Stanford; Yousef A. Khalidi, Sunnyvale, both of Calif.

[73] Assignee: Sun Microsystems, Inc., Mountain View, Calif.

[21] Appl. No.: 359,403

[22] Filed: Dec. 20, 1994

[51] Int. Cl.⁶ ..................................................... G06F 12/12
[52] U.S. Cl. ............................................ 395/461; 395/486
[58] Field of Search ...................................... 395/460, 471, 395/472, 486, 461

[56] References Cited

U.S. PATENT DOCUMENTS 5,353,425  10/1994  Malamy et al. ........................ 395/471
5,357,623  10/1994  Megory-Cohen ...................... 395/425

OTHER PUBLICATIONS

Nayfeh, "Exploring the Design Space for a Shared-Cache Multiprocessor," Proceedings of The 21st Annual International Symposium on Computer Architecture, Apr. 18–21, 1994, Chicago, Illinois, pp. 166–175.

Patterson, et al., *Computer Architecture: A Quantitative Approach*, (Morgan Kaufmann Publishers, 1990) pp. 408–425.

Patterson, et al., *Computer Organization and Design The Hardware/Software Interface*, (Morgan Kaufmann Publishers, 1994) pp. 458–481, 501–515.

Primary Examiner—David L. Robertson
Attorney, Agent, or Firm—Flehr, Hohbach, Test, Albritton & Herbert

[57] ABSTRACT

An apparatus and method to dynamically partition a set-associative memory device is described. The apparatus includes a set identification device to specify a group of set-associative data blocks in a cache memory or translation-lookaside buffer. A block replacement logic circuit is used to identify replaceable blocks within the set-associative data blocks that can store new information. The block replacement logic circuit is also used to identify un-replaceable blocks within the set-associative data blocks that cannot store new information. The block replacement logic circuit only writes new information to the replaceable blocks of the set-associative data blocks. The block replacement logic circuit can be implemented using a block replacement mask to identify within the set-associative data blocks the replaceable blocks and the un-replaceable blocks.

9 Claims, 4 Drawing Sheets

APPARATUS AND METHOD TO PRESERVE DATA IN A SET ASSOCIATIVE MEMORY DEVICE

BRIEF DESCRIPTION OF THE INVENTION

This invention relates generally to the storage of information in computer memories. More particularly, this invention describes a set-associative memory device, such as a cache memory or translation-lookaside buffer, which is dynamically partitioned to prevent the overwriting of selected data in the memory device.

BACKGROUND OF THE INVENTION

A computer operates by executing a program. A program is a set of logical operations that are executed in relation to a set of data. The data is specified with a physical address. The physical address is accessed by the computer, and the data stored at that physical address is processed in accordance with a specified logical operation of the program.

Different techniques are used to process a physical address. A set-associative memory structure uses a portion of the physical address to access a set of data blocks. Another segment of the physical address is then used for comparison with a tag field in each block of the set of data blocks. If the tag field of one of the blocks in the set of data blocks matches the physical address segment, then the data from that block is used for subsequent processing.

A set-associative memory structure stands in contrast to a fully-associative memory structure. In a fully-associative memory structure, the memory structure effectively has one set with a large number of blocks within the set. Data can be written to or read from any block in the single set. In a direct mapped memory structure, a large number of sets are defined, with each set including one block. Data can be written to or read from any of the sets of the direct mapped memory.

A cache memory is a memory structure that is used to store frequently accessed data. The advantage of a cache memory is that it is extremely fast. Consequently, it is highly desirable to keep frequently accessed data within a cache memory.

Cache memories typically utilize either a set-associative memory structure, fully-associative memory structure, or direct mapped memory structure. The present invention is directed toward a set-associative cache memory. The techniques of the invention are equally applicable to other set-associative memory structures, such as translation-lookaside buffers.

A cache memory is used in conjunction with the execution of one or more programs. Computers commonly run multiple programs. When a computer is running multiple programs, each program attempts to load its frequently used data into the cache memory. When control is switched from a first program to a second program, the second program loads its frequently used data into the cache memory, thereby overwriting the frequently used data of the first program. That is, as data from the second program is required in the cache, individual blocks that contain information from the first program are overwritten with information from the second program. When processing returns to the first program, the frequently used data of the first program is no longer in the cache memory. Consequently, the frequently used data of the first program must be reloaded into the cache memory. Of course, this overwrites the frequently used data of the second program, necessitating the re-loading of this data when the second program is called at a later time.

Substitution of cache memory information produces processing delays. Thus, it would be highly desirable to provide a technique for reducing the processing delays associated with the overwriting of frequently used data in a cache memory of a computer that is running multiple programs. It would also be desirable to apply the technique to other set-associative memory structures, such as translation-lookaside buffers.

SUMMARY OF THE INVENTION

The invention is an apparatus to dynamically partition a set-associative memory structure. The apparatus includes a set identification device to specify a group of set-associative data blocks in a cache memory or translation-lookaside buffer. A block replacement logic circuit is used to identify replaceable blocks within the set-associative data blocks that can store new information and un-replaceable blocks within the set-associative data blocks that cannot store new information. The block replacement logic circuit is preferably implemented using a block replacement mask to identify within the set-associative data blocks the replaceable blocks and the un-replaceable blocks. The block replacement logic circuit only writes new information to the replaceable blocks of the set-associative data blocks.

The method of the invention includes the step of indexing a set of data blocks in a memory structure, such as a cache memory or translation-lookaside buffer. Thereafter, block replacement logic is used to identify replaceable blocks within the set of data blocks that can store new information and un-replaceable blocks within the set of data blocks that cannot store new information. New information is only written to the replaceable blocks of the set of data blocks.

By limiting the ability to write data into the memory structure, the memory structure can be partitioned in a dynamic fashion to prevent frequently used data from being overwritten during a switch in processes running on the computer. Thus, the frequently used data of a dominant process running on the computer will not be overwritten when a less frequently used process is writing information into the memory structure.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

The invention is a method and apparatus to dynamically partition a set-associative memory device. For the purpose of illustration, the invention is described in relation to a cache memory and a translation-lookaside buffer. Attention initially focuses on the general operation of a cache memory and a translation-lookaside buffer in a computer. Thereafter, a computer incorporating the dynamically partitioned set-associative memory device of the invention will be described.

Figure 1:
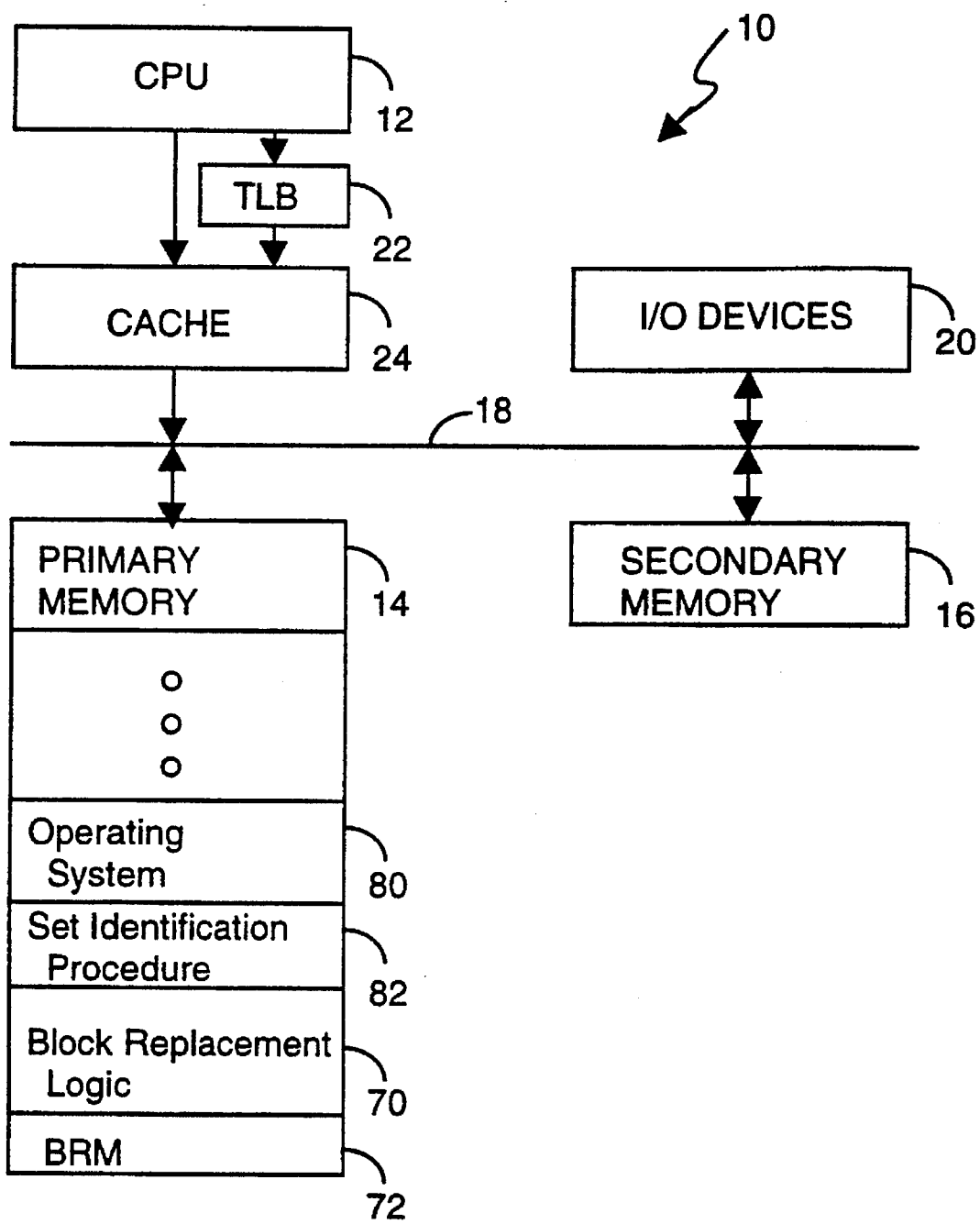
FIG. 1 illustrates a general purpose computer configured in accordance with one embodiment of the present invention.

FIG. 1 illustrates a general purpose computer 10 that includes a central processing unit 12 that communicates with primary memory (generally Random Access Memory) 14 and secondary memory (generally disk storage) 16 over a system bus 18. Input/Output devices 20, such as keyboards, monitors, printers, or data acquisition cards, are also connected to the system bus 18. The CPU 12 executes one or more computer programs, which will be discussed below, that are stored in primary memory 14.

Most instructions and data in a computer program have a corresponding virtual address. Each virtual address is then translated to a physical address. As will be described below, a translation-lookaside buffer 22 may be used for rapidly translating between a virtual address and a physical address. The physical address is then compared to the physical addresses in a cache memory 24. The cache memory 24 stores recently or frequently used physical addresses and data corresponding to the physical addresses. If a specified physical address is not in cache memory 24, then an attempt is made to locate the physical address in primary memory 14. If the required information is not in primary memory 14, then a page fault occurs, and the CPU 12 loads the required information from secondary memory 16 into primary memory 14.

The use of virtual addresses in a computer is a technique commonly referred to as "virtual memory". Practically all computers rely upon virtual memory. Virtual memory allows a computer to execute a program that includes a range of addresses that may exceed the actual memory storage capacity of the computer. Thus, programmers are not restricted by memory-size considerations, and the programs are portable between hardware environments with different memory capacities.

As indicated above, there is a need to translate between a virtual address and a physical address. The virtual address is the address locally used by a program. The physical address specifies the actual physical location of the information in the primary memory 14.

Figure 2:
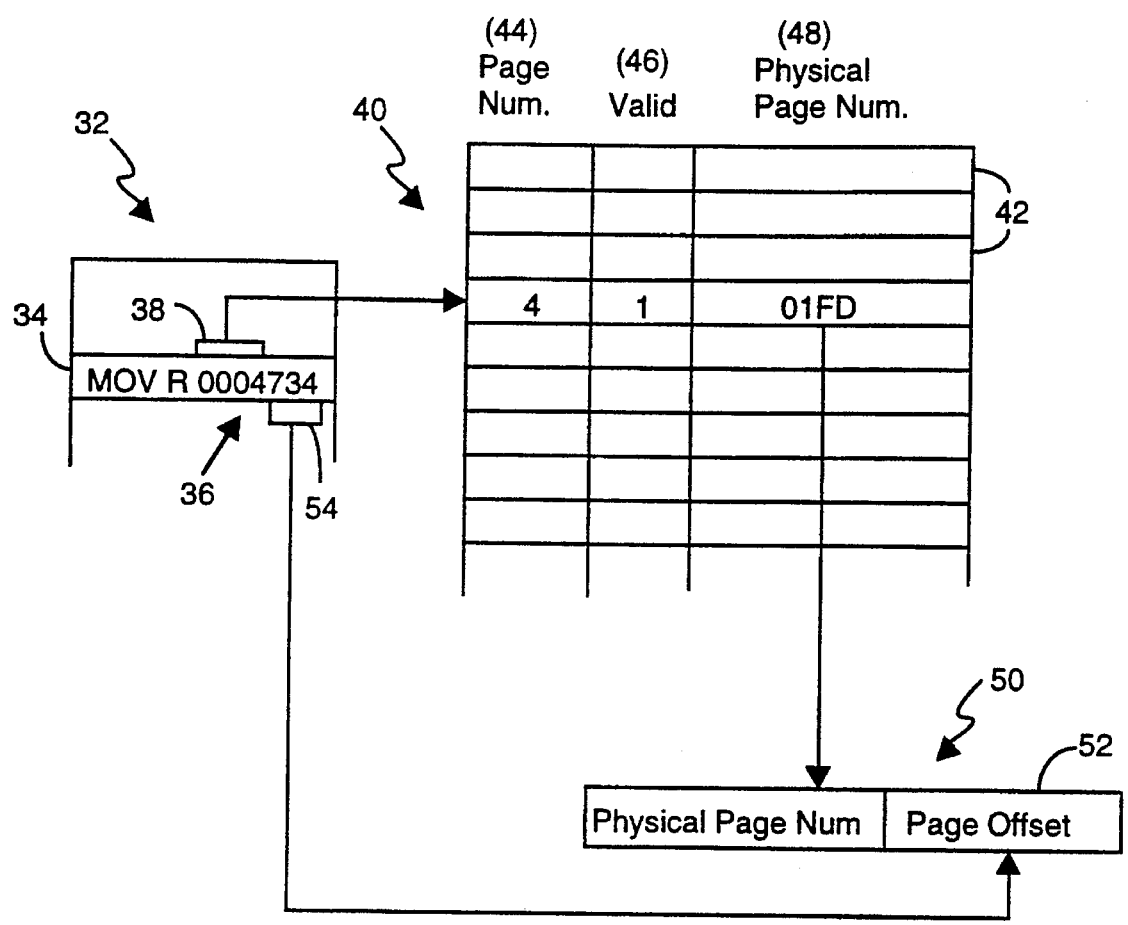
FIG. 2 illustrates an address translation process between a virtual address and a physical address.

FIG. 2 illustrates the translation operation between a virtual address and a physical address. A computer program 32, stored in primary memory 14, includes a set of instructions, one such instruction is illustrated as element 34 in FIG. 2. The instruction 34 is a command to move ("MOV") to register "R" the contents of memory corresponding to the virtual address "0004734" (36). The numbers are in base 16 Hexadecimal. The virtual address 36 includes a virtual page number "0004" (38), also called a virtual memory page address, that is mapped to a page table 40. The page table 40 includes a set of page table translation entries 42. Each page table translation entry 42 includes a virtual page number 44, a valid bit 46, and a physical page number 48 (also called a physical memory page address). If the valid bit is set (digital one), this indicates that a physical page number 48 exists in primary memory 14 corresponding to the virtual page number 38. If the valid bit is not set, then a page fault occurs and the physical page number 48 must be found in secondary memory 16 by the CPU 12. The physical page number 48 specifies a page of memory in primary memory 14. The terms primary memory 14 and physical memory will be used interchangeably herein.

FIG. 2 illustrates the use of a virtual page number as a virtual address. It will be appreciated by those skilled in the art that the virtual page number can be substituted with an entry that allows the derivation of a virtual address. References in this document to virtual page numbers or virtual memory translation entries are intended to describe any virtual page number system or related scheme used to derive a virtual address.

A complete physical address 50 includes the physical page number 48 and a page offset 52. The page offset 52 specifies the row in the page of memory that the address of interest can be found. The page offset 52 is directly obtained (without translation) from the virtual offset portion 54 of the virtual address 36.

In sum, to obtain a physical address 50 from a virtual address 36, the virtual page number 38 of the virtual address (in this example "0004") is mapped to a page table translation entry 42 found in a page table 40. If the page table translation entry 42 has its valid bit set to one, then there is a corresponding physical page number for the virtual page number. The physical page number (in this example "01FD" Hex) forms a portion of the physical address 50. The other portion of the physical address 50 is a page offset value 52 (in this example "734") that is obtained from the virtual offset portion 54 of the virtual address 36.

To improve the performance of page tables 40, modern computers include a special cache that keeps track of recently used translations. The recent translations are stored because once a translation for a virtual page number is used, it will probably be used again in the near future. This special address translation cache is referred to as a translation-lookaside buffer, or TLB. FIG. 1 generally illustrates a TLB 22. A TLB 22 includes a set of TLB translation entries. Typically, a TLB translation entry includes a virtual page number, a valid bit, and a physical page number.

A CPU 12 running a computer program initially compares each virtual page number from the computer program to the entries in the TLB 22. If a match is found (called a hit), the physical page number from the TLB 22 is used to form the physical address 50, in the manner previously described.

A TLB 22 is typically implemented in hardware and therefore has fewer entries than a page table 40. In view of the smaller size of a TLB 22, TLB misses occur frequently. After a TLB miss, the page table 40 is queried to determine the physical address. If the page table 40 has the desired information, that information can be loaded from the page table 40 into the TLB 22.

After the physical address is obtained, either from the TLB 22 or the page table 40, it is used to access the data associated with the physical address. The cache 24 stores a set of recently or frequently accessed physical addresses. If the physical address is not found in cache 24, then the primary memory 14 is searched. If the address still has not been found, secondary memory 16 is searched. The cache 24, primary memory 14, and secondary memory 16 form a hierarchy wherein the cache memory is relatively fast but has a low information content and the secondary memory 16 is relatively slow but has a high information content. Thus, it is desirable to use the cache memory for its speed benefits. However, since the cache memory has a low information content, it is desirable to insure that the information content is selected in a controlled manner to improve the data hit rate.

Figure 3:
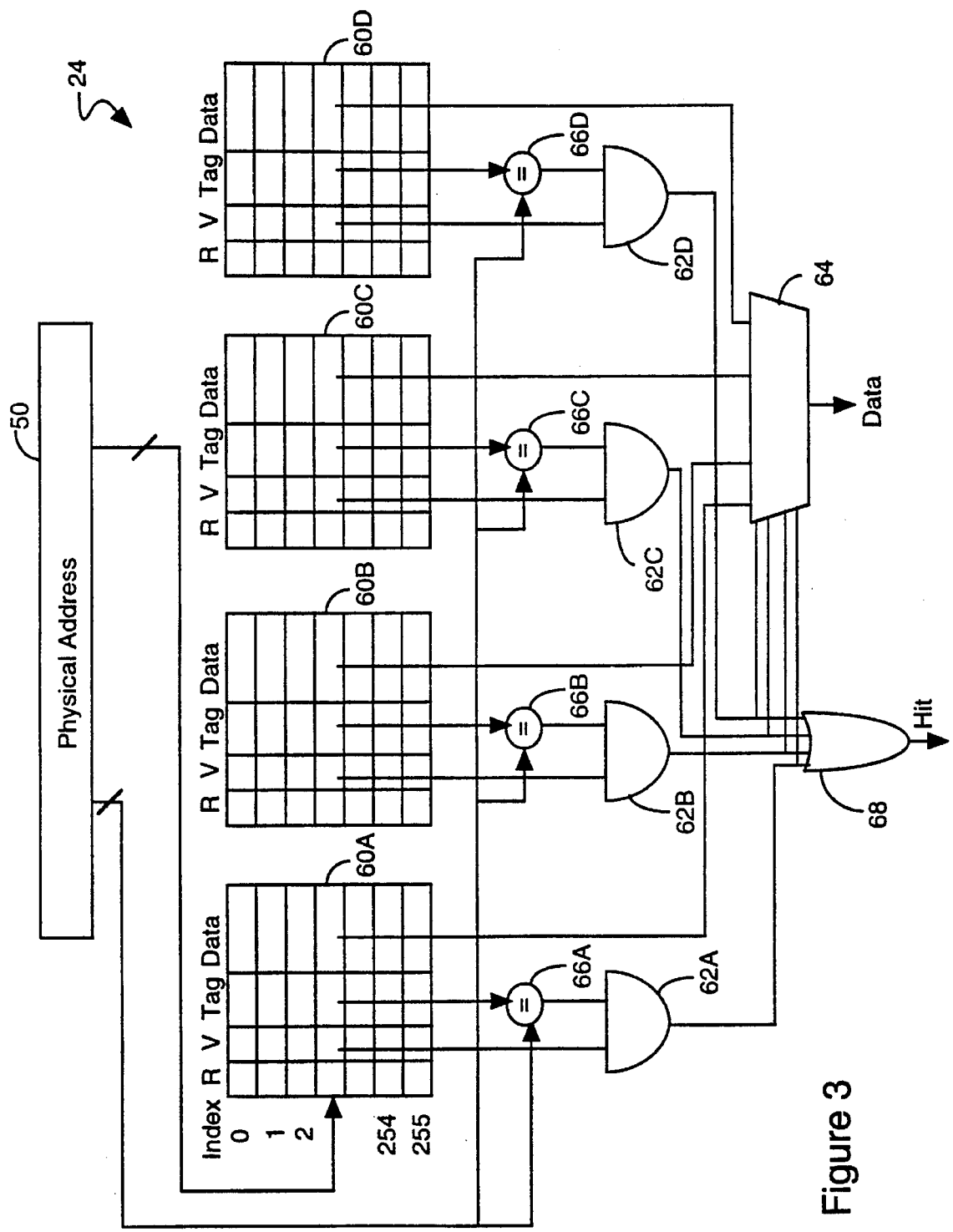
FIG. 3 illustrates a cache memory architecture in accordance with one embodiment of the invention.

FIG. 3 illustrates the matching of a physical address 50 in a set-associative cache memory 24. A set-associative cache consists of a number of sets, each of which consists of n blocks. In the example of FIG. 3, index values between 0 and 255 indicate that there are 256 sets. Each set includes four blocks 60A, 60B, 60C, and 60D. Thus, FIG. 3 illustrates a four-way set-associative cache.

Once a set is identified, all of the blocks in the set, four in this example, are searched for a match with the specified physical address 50. As shown in FIG. 3, a portion of the physical address 50 is used as an index value to select a set of blocks 60. Another portion of the physical address 50 is used to compare the tags of all blocks 60 in the indexed set. If a match is found, then the data associated with the matched tag is used as the output. In the four-way set associative cache of FIG. 3, four comparators 62A, 62B, 62C, and 62D are used, together with a 4-to-1 multiplexor 64 to choose among the four potential members of the selected set. Logical AND gates 62A, 62B, 62C, and 62D are used to confirm that the valid bit is set and that tag data is present. Comparison circuits 66A, 66B, 66C and 66D are used to compare the physical address segment with the different tags of the specified set. A high signal from logical OR gate 68 indicates when a cache hit exists.

When a physical address is not found in a cache memory, a "cache miss" occurs. A cache miss results in the substitution of some information in the cache with information that is presently needed in the cache. That is, certain blocks within a selected set are substituted. There are two primary strategies used in selecting which block to replace in a set-associative memory structure. One strategy randomly selects blocks using hardware assistance. Another strategy is the least recently used approach. As its name implies, the least recently used approach selects blocks that have not been used for a long time. Random selection is advantageous because it is simple to implement in hardware. The least recently used approach eliminates data that is not being used, but there is a high computational overhead in keeping track of blocks.

As indicated in the background section, the prior art approach to replacing blocks of information in a set-associative cache memory may result in information being removed from the cache memory that will have to be re-loaded into the cache memory shortly after being removed. The present invention is directed toward solving that problem.

Figure 4:
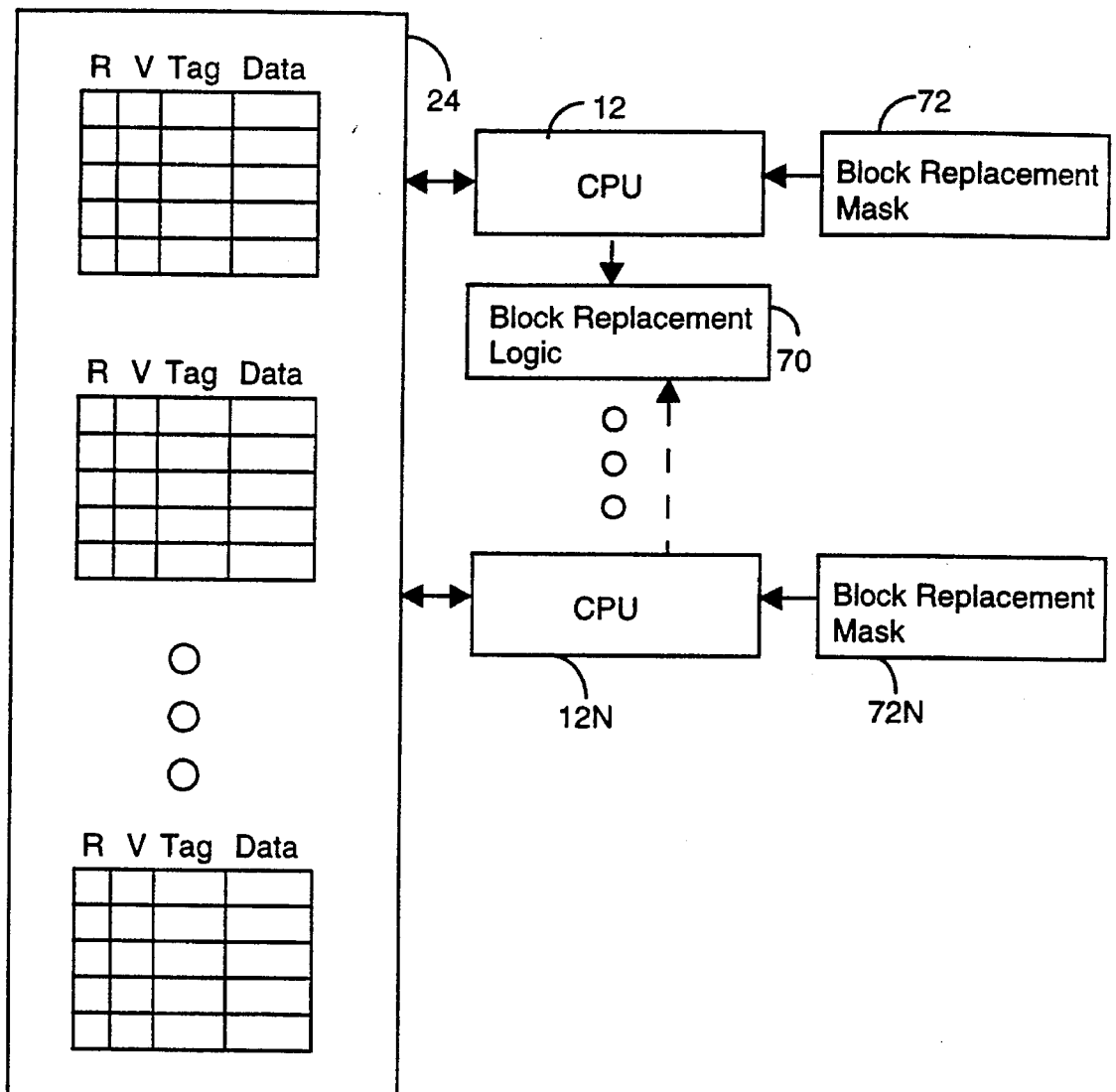
FIG. 4 illustrates a cache memory architecture and related control logic in accordance with one embodiment of the invention.

FIG. 4 illustrates a dynamically partitioned set-associative cache 24 in accordance with one embodiment of the invention. The cache 24 interacts with CPU 12. The CPU 12 also interacts with block replacement logic 70. Block replacement logic 70 may include a random, least recently used, or other block replacement scheme. Block replacement logic 70 uses a block replacement mask (BRM) 72 before substituting a block. The BRM 72 contains k bits, where k is the number of blocks per set, or in other words, its set-associativity. Referring to the example of FIG. 3, the BRM 72 would contain four bits.

Thus, each bit set in the BRM 72 effectively results in 1/k of the cache being preserved from replacement. Dynamic partitioning results from the block replacement logic 70 selectively locking and unlocking the cache in accordance with the BRM 72. That is, if the replacement bit is not set (digital low) then the block entry is processed in accordance with the prior art. That is, an individual block is substituted according to an unmodified block replacement logic. On the other hand, if the replacement bit is set (digital high), then the block cannot be substituted. Thus, frequently called data can be locked into the cache. Again referring to the example of FIG. 3, a BRM bit pattern of 0010 would mean that blocks 60A, 60B, and 60D are replaceable, but block 60C is not replaceable. In the prior art, all blocks are replaceable and there is no practical way to preserve individual blocks from being overwritten.

The block replacement scheme of the invention is most beneficial when multiple processes are running and one of the processes dominates CPU time. For a dominant process of this type, it is desirable to lock selected blocks into the cache 24. As a result, at least some of the data in the cache for the dominant process will remain in the cache even when other processes are called. In this way, when the operations associated with the other processes are completed and control returns to the dominant process, data associated with the dominant process is already resident in the cache 24, and thus time is not required to load the information into the cache.

In lieu of using a block replacement mask 72, an additional replacement bit may be used in each data block. This implementation is shown in FIGS. 4 and 3. Each block in the cache memory 24 of these figures includes a valid tag (V) to indicate the presence of data, a Tag for comparison to a segment of the physical address, and data to be read when a hit exists. In addition, there is a replacement bit (R), that is used to identify replaceable blocks. This implementation has a higher overhead as each data block requires an additional bit. This implementation also fails to exploit the modularity of the set-associative structure.

Regardless of the implementation used, the cache 24 of the invention behaves as an unpartitioned cache for read and write accesses, while providing protection from replacements due to misses in the cache. If the partitioning is not beneficial in a given application, it may simply be disabled, by turning off all the replacement bits in the block replacement mask 72.

FIG. 1 illustrates an operating system 80 stored in primary memory 14. The operating system 80 executes a set identification procedure 82, also called a set identification device, to process a given address to identify a set of data blocks corresponding to the given address. In the case of a cache memory, each data block includes a "V" valid bit, a "Tag" field, and a "Data" field, as shown in FIG. 3. The identified set of FIG. 3 includes four data blocks 60A, 60B, 60C, and 60D. In the case of a TLB, each data block includes a page number, valid bit, and physical page number, as shown in FIG. 2. The identified set of a TLB would include multiple table entries 42.

The block replacement logic 70 and the block replacement mask 72 may be implemented as software instructions stored in primary memory 14. The block replacement logic 70, which is also referred to as a block replacement logic circuit, compares the individual bits of the block replacement mask with the corresponding blocks of the specified set to identify replaceable blocks and un-replaceable blocks within the specified set. If the invention is implemented without a block replacement mask 72, but with a replacement bit in each data block, then the block replacement logic 70 simply checks the setting of the replacement bit in the data block.

The block replacement circuit 70 may also be implemented in hardware by relying upon a set of comparators. The block replacement mask 72 is preferably implemented as a physical register whose bits are set by the operating system 80.

It will be appreciated by those skilled in the art that the shared cache 24 can provide substantial performance gains in parallel applications due to shared working set effects, pre-fetching, and a reduction in cache invalidations or updates performed in the system.

The invention may be used to support a single cache used by multiple processors. In such an embodiment, shown in FIG. 4, each processor 12 through 12N preferably has its own region of the cache 24 for replacements. In the alternative, each processor 12 has individual regions with some overlap. This approach reduces destructive interference on the cache miss rates associated with shared caches in multiprocessor systems.

In order to support multiple processors, each processor 12 through 12N has a separate BRM 72 through 72N in the cache. When a particular processor needs to make a replacement in the cache, the block replacement logic 70 uses the specified processor's corresponding BRM 72 to determine how the replacement should be made.

A simple modification of the apparatus of FIG. 4 is used to accomplish a translation-lookaside buffer implementation of the invention. The "R" replacement bit and "V" valid bit of each block remains the same. However, instead of a "Tag" field, a page number field is used and instead of a "Data" field, a physical page number field is used. A structure of this type is shown in FIG. 2. If the block replacement mask 72 is used in the TLB embodiment, then the "R" replacement bit is not used.

The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

We claim:

1. A method of storing information in a computer memory, said method comprising the steps of:

specifying a set of k data blocks;

using block replacement logic to identify whether a selected data block of said set of k data blocks is replaceable;

checking a block replacement mask containing k bits corresponding to said k data blocks to identify whether said selected data block is unlocked; and writing new information to said selected data block only if said block replacement mask indicates that said selected data block is unlocked.

2. The method of claim 1 wherein said specifying step includes the step of specifying a set of data blocks in a cache memory.

3. The method of claim 1 wherein said specifying step includes the step of specifying a set of data blocks in a translation-lookaside buffer.

4. An apparatus to store information in a computer memory, said apparatus comprising:

a set identification device to specify a set of k data blocks;

a block replacement mask containing k bits, each bit specifying whether a selected data block of said set k data blocks is replaceable; and a block replacement logic circuit to identify from said block replacement mask a replaceable data block of said set of k data blocks, and write new information to said replaceable data block.

5. The apparatus of claim 4 wherein said set identification device specifies a set of data blocks in a cache memory.

6. The apparatus of claim 4 wherein said set identification device specifies a set of data blocks in a translation-lookaside buffer.

7. A method of constructing an apparatus to store information in a computer memory, said method comprising the steps of:

providing a set identification device to specify a set of k data blocks;

providing a block replacement mask containing k bits, each bit specifying whether a selected data block of said set k data blocks is replaceable; and providing a block replacement logic circuit to identify from said block replacement mask a replaceable data block of said set of k data blocks, and write new information to said replaceable data block.

8. The method of claim 7 further comprising the step of identifying a set of data blocks in a cache memory.

9. The method of claim 7 further comprising the step of identifying a set of data blocks in a translation-lookaside buffer.

* * * * *